(12) United States Patent
Cheng

(10) Patent No.: US 7,033,467 B2
(45) Date of Patent: Apr. 25, 2006

(54) DEVICE FOR CHARGING AND ACTIVATING HYDROGEN STORAGE CANISTER

(75) Inventor: Yaw-Chung Cheng, Taipei (TW)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 250 days.

(21) Appl. No.: 10/351,505

(22) Filed: Jan. 27, 2003

(65) Prior Publication Data

US 2003/0192779 A1    Oct. 16, 2003

(30) Foreign Application Priority Data

Apr. 15, 2002 (TW) .............................. 91107556 A

(51) Int. Cl.
*F17C 5/06* (2006.01)
*C25B 1/04* (2006.01)

(52) U.S. Cl. .......................... 204/266; 141/18; 141/21

(58) Field of Classification Search ................ 204/270, 204/256, 258, 266; 141/18, 234
See application file for complete search history.

(56) References Cited

U.S. PATENT DOCUMENTS

| | | | | |
|---|---|---|---|---|
| 4,002,553 A | * | 1/1977 | Arntz | 204/278 |
| 4,657,055 A | * | 4/1987 | Poulsen | 141/83 |
| 5,391,366 A | * | 2/1995 | Yamamoto et al. | 423/658.2 |
| 5,427,160 A | * | 6/1995 | Carson et al. | 141/4 |
| 5,512,145 A | * | 4/1996 | Hollenberg | 205/628 |
| 6,488,059 B1 | * | 12/2002 | Frank et al. | 141/351 |

\* cited by examiner

*Primary Examiner*—Harry D Wilkins, III
(74) *Attorney, Agent, or Firm*—Rosenberg, Klein & Lee

(57) ABSTRACT

A device for charging and activating hydrogen storage canisters made of hydrogen storage alloy includes a container for receiving and retaining the canisters. Cold and hot water tanks are respectively connected to the container for supplying cold and hot water to and through the container in order to maintain desired temperatures of the canisters. A vacuum pump is connected to the canisters for discharging residual hydrogen from the canisters in an activating process. Hot water is supplied from the hot water tank to the container to heat the canisters during the discharging process. A hydrogen supply source is connected to the connectors via a distribution and charge control unit for supplying and distributing hydrogen to each individual canister. Cold water is supplied from the cold water tank to the container for removing excessive heat of the canisters in order to maintain a proper charging rate of hydrogen. In addition, by repeating the charging and discharging processes, the hydrogen storage alloy of the canisters is activated.

14 Claims, 6 Drawing Sheets

DEVICE FOR CHARGING AND ACTIVATING HYDROGEN STORAGE CANISTER

BACKGROUND OF THE INVENTION

1. Field of the Invention

The present invention relates generally to the field of hydrogen storage with metal hydride based hydrogen storage alloys, and in particular to a device for charging and activating the hydrogen storage alloys contained in canisters.

2. Description of the Prior Art

Hydrogen is the most abundant element in the universe and can be a great energy source. However, due to the low density of hydrogen gas, storage of hydrogen is a challenge to the hydrogen energy industry. A variety of ways are currently available for storage of hydrogen. For example, hydrogen can be stored in a compressed gas form. Compressing hydrogen is an expensive process and the compressed hydrogen gas still occupies a great amount of space. In addition, the high pressure of compressed hydrogen is adverse to operation safety.

Hydrogen can also be stored in liquid state. However, liquid hydrogen must be stored under cryogenic temperature. A great amount of energy is required to maintain the extreme low temperature. Also, continuously venting is a safety issue to be concerned.

One of the most feasible ways for economically storing hydrogen is hydride form. Metal hydrides, which are formed by metallic materials commonly referred to as hydrogen storage alloy, are employed to absorb and hold a great amount of hydrogen at room temperature. Some of the hydrogen storage alloys can store hydrogen at a higher density than pure hydrogen, which make them economically advantageous.

The hydrogen storage alloys are commonly deposited in a container or a canister and is activated by charging hydrogen into the canister. Once a hydrogen storage canister is fabricated, the hydrogen storage alloy contained therein must be activated by repeatedly charging and releasing hydrogen. A similar process is also adopted to restore the capacity of poisoned hydrogen storage alloy, which is caused by absorption of impurity, by the metal hydrides.

Once the hydrogen held in the hydrogen storage canister exhausts, the canister has to be recharged with hydrogen. This is usually done by refilling hydrogen into the canister, causing the hydrogen storage alloy to take up the hydrogen. Since a variety of metal hydrides are available for storage of hydrogen, different charging conditions are required for recharging hydrogen storage canister made of different metal hydrides. Among the known metal hydrides, LaNi based metal hydrides, FeTi based metal hydrides and Mg based metal hydrides are most commonly used in powering electrical vehicles.

In recharging the hydrogen storage canister, a high hydrogen pressure and a predetermined flow rate of hydrogen must be maintained in order to achieve desired charging result. In addition, the hydrogen storage alloy releases heat when it absorbs hydrogen. The heat must be properly removed in order for the alloy to continuously take up hydrogen to the maximum capacity thereof. The rate at which the hydride alloy absorbs hydrogen is dependent upon the rate at which the heat is removed from the alloy. On the other hand, when the hydrogen storage alloy releases hydrogen, it absorbs heat, causing drop-down of temperature. To ensure proper release rate of hydrogen from the alloy, the alloy must be maintained at a suitable operation temperature by internal or external heating.

In addition to the requirements for charging and discharging hydrogen discussed above, a commercial hydrogen charging device must have a structural strength sufficient to support a number of hydrogen storage canisters, which may be weighted 4–5 Kg each, in order to charge the canisters efficiently. Cooling and heating the canisters inside the charging device is also an important concern for efficient charging process. To be even more efficient, quick connectors for connecting the canisters to a hydrogen supply source are also required in a commercial charging device. All these are heretofore not available in any commercial device or machine for efficiently charging hydrogen storage canisters.

For safety and effectiveness purposes, evacuation of impurity gas from the canisters and filling of inertial gas during leakage of hydrogen are also required for a commercial charging machine. Still, these requirements are not met by any known and market available commercial hydrogen recharging machines.

It is thus desired to provide a device for charging and activating hydrogen storage canister made of metal hydrides that eliminates the above deficiencies.

SUMMARY OF THE INVENTION

Thus, an object of the present invention is to provide a device for efficiently and safely charging/activating a number of hydrogen storage canisters made of metal hydrides.

Another object of the present invention is to provide a device for activating hydrogen storage alloy contained in hydrogen storage canister in a batch process.

A further object of the present invention is to provide a device for charging hydrogen storage canisters in a batch process.

To achieve the above objects, in accordance with the present invention, there is provided a device for charging/activating hydrogen storage canisters made of hydrogen storage alloy comprising a container in which the canisters are deposited. Quick connection type connectors are formed in the container for releasable and ready connection with the canisters for charging/discharging the canisters. Cold and hot water tanks are respectively connected to the container for supplying cold and hot water to and through the container in order to maintain desired temperatures of the canisters. A vacuum pump is connected to the canisters for withdrawing/discharging residual hydrogen from the canisters in an activating process. Hot water is supplied from the hot water tank to the container to heat the canisters during the discharging process. A hydrogen supply source is connected to the connectors via a distribution and charge control unit for supplying and distributing hydrogen to each individual canister. Cold water is supplied from the cold water tank to the container for removing excessive heat of the canisters in order to maintain a proper charging rate of hydrogen. In addition, by repeating the charging and discharging processes, the hydrogen storage alloy of the canisters is activated.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
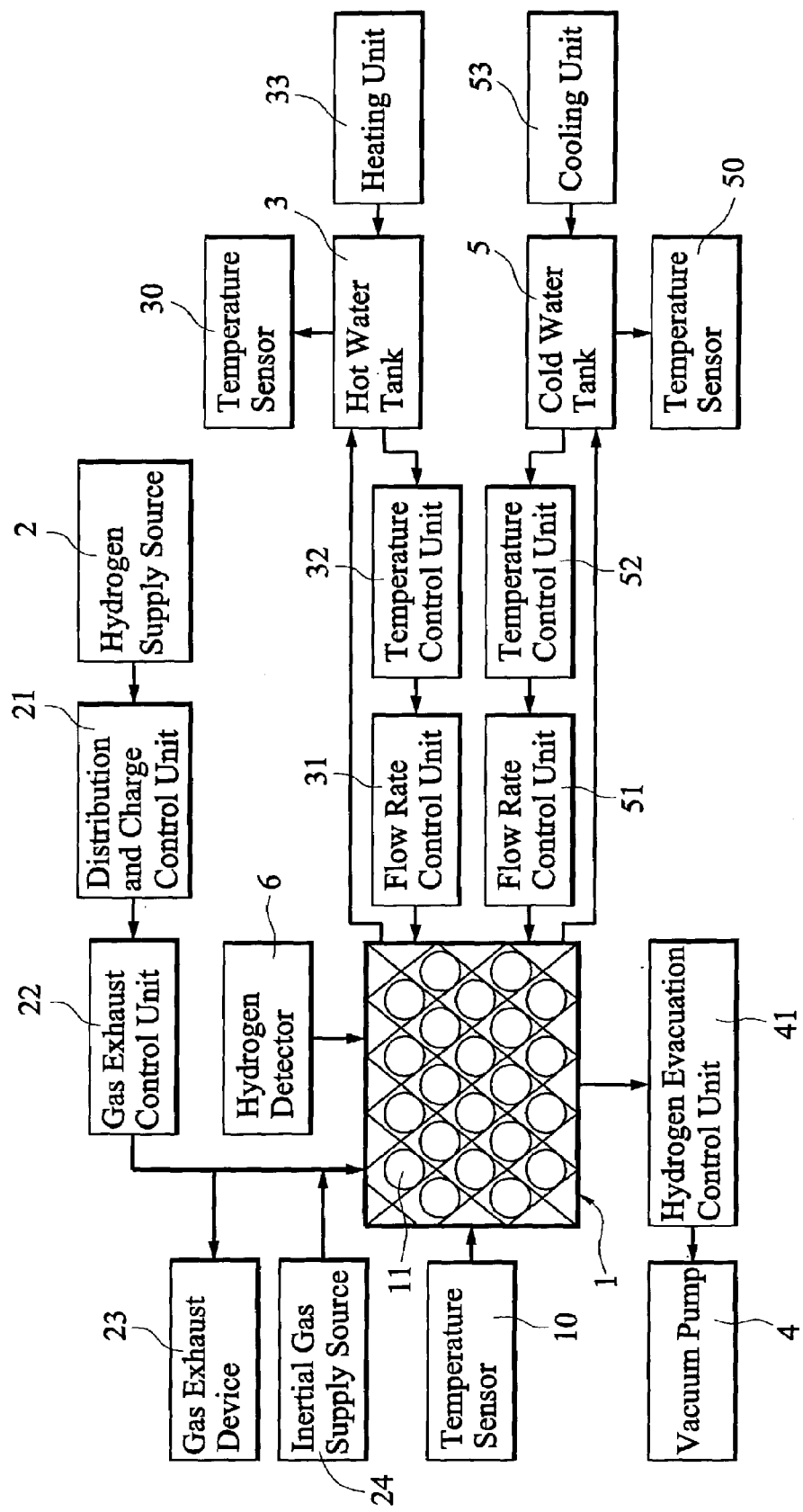
FIG. 1 is a system block diagram of a hydrogen storage container charging/activating device constructed in accordance with the present invention.

With reference to the drawings and in particular to FIG. 1, a device for charging/activating hydrogen storage alloy in a canister in accordance with the present invention comprises a canister receiving container 1 which defines an interior space (not labeled) for receiving and retaining a number of hydrogen storage canisters 11. A hydrogen supply source 2 is connected to the container 1 for supplying hydrogen to the canisters 11 deposited in the container 1 via piping connected between the container 1 and the hydrogen supply source 2. A gas exhaust control unit 22 is arranged between the hydrogen supply source 2 and the container 1 to control expulsion/removal of impurity or undesired gas from the container 1 through a gas exhaust device 23 that is connected to the piping between the hydrogen supply source 2 and the container 1.

A distribution and charge control unit 21 is also mounted between the hydrogen supply source 2 and the container 1 for distributing and controlling the amount of hydrogen supplied to each individual canister 11 inside the container 1. In addition, a hot water tank 3 and a cold water tank 5 are respectively connected to the container 1 via a flow rate control unit 31, 51 and a temperature control unit 32, 52 for supplying temperature-controlled hot and cold waters to the container 1 in order to maintain the temperature of the canisters 11 during charging and discharging processes of the canisters 11. Each water tank 3, 5 is provided with individual temperature sensor 30, 50 and heating or cooling units 33, 53 for maintaining the temperature of the water inside the tank 3, 5.

A vacuum pump 4 is connected to the container 1 via a hydrogen evacuation control unit 41 to evacuate or discharge the residual hydrogen inside the canisters 11. An inertial gas supply source 24 is connected to the container 1 in order to timely supply an inertial gas to the container 1 in case that hydrogen leaks out of the canisters 11 during the charging/activating process. The inertial gas dilutes and flushes the hydrogen out of the container for safety purposes.

A number of hydrogen detectors 6 are mounted to the container 1 in a suitably distributed manner to detect leakage of hydrogen from the canisters 11 during charging/discharging the canisters 11.

In a charging process, hydrogen is supplied from the hydrogen supply source 2 through the distribution and charge control unit 21 to each of the canisters 11 deposited inside the container 1. The canisters 11 contain hydrogen storage alloy which takes up hydrogen supplied thereto and which releases heat when taking up the hydrogen, causing rise of temperature and reducing absorption rate of hydrogen. Thus, cold water is supplied from the cold water tank 5 to the container 1 to circulate around the canisters 11 in order to remove excessive heat released from the hydrogen storage alloy in taking up hydrogen and thus maintain the desired hydrogen absorption rate. The cold water supplied to the container 1 is controlled by the flow control unit 51 based on the temperature control unit 52. One or more temperature sensors 10 is arranged for detection of the temperature inside the container 1 in order to control the flow rate of cold water into the container 1. The cold water temperature inside the cold water tank 5 is detected by the temperature sensor 50 and if necessary, the cooling device 53 is actuated to lower down the temperature of the cold water inside the cold water tank 5.

In an activating process, hydrogen residual inside the canisters 11 must be discharged/released/removed first. This is done by means of the vacuum pump 4 that withdraws the residual hydrogen from the canisters 11. The hydrogen evacuation control unit 41 controls the evacuation process. The canisters 11 absorb heat when they discharge the residual hydrogen, lowering down the temperature thereof. The low temperature results in a low rate of discharging hydrogen from the hydrogen storage alloy inside the canisters 11. Thus, hot water is supplied from the hot water tank 3 to the container 1 to circulate around the canisters 11 in order to compensate the amount of heat absorbed by the hydrogen storage alloy in releasing hydrogen and thus maintaining the desired hydrogen discharge rate. The hot water supplied to the container 1 is controlled by the flow control unit 31 based on the temperature control unit 32. The temperature sensors 10 arranged inside the container 1 for detection of the temperature inside the container 1 help controlling the flow rate of hot water to the container 1. The hot water temperature inside the hot water tank 3 is detected by the temperature sensor 30 and if necessary, the heating device 33 is actuated to heat the hot water inside the hot water tank 3.

The second phase of the activating process is to charge the canisters 11 with hydrogen. The charging process is identical to those described above. Namely, hydrogen is supplied from the hydrogen supply source 2 to each individual canister 11 under the control of the distribution and charge control unit 21. Cold water from the cold water tank 5 is circulated through the container 1 to remove heat released by the hydrogen storage alloy during the charging process. The first discharging phase and the second charging phase of the activating process are performed alternately and repeatedly to restore the capacity of the hydrogen storage alloy contained in the canisters 11. This process is also applicable to canisters of which the hydrogen storage alloy is poisoned by impurity. The impurity absorbed in the hydrogen storage alloy can be effectively removed by alternately repeating the discharging and charging phases of the activating process.

At the beginning of the operation of the device, a certain amount of undesired gas, such as air, is residual inside the piping of the device. The undesired gas is removed by means of the gas exhaust device 23 under the control of the gas exhaust control unit 22. An example of the gas exhaust device 23 includes a discharge valve and a discharge port. After the exhaust of the undesired gas, the gas exhaust device 23 is shut down and hydrogen flow supplied from the hydrogen supply source 2 is substantially not entrained by any undesired gas, ensuring the purity of hydrogen supplied to the canisters 11.

In accordance with the present invention, for safety purposes, the hydrogen supply source 2 is automatically closed once the hydrogen detector 6 detects leakage of hydrogen in the container 1. At the same time, the inertial gas supply source 24 is activated to supply an inertial gas to the container 1 in order to dilute and flush the hydrogen out of the container 1. An emergency manual control 75 (see FIG. 2) may be provided for manually actuating the gas exhaust control unit 22 to expel the leaking hydrogen out of the container 1.

Figure 2:
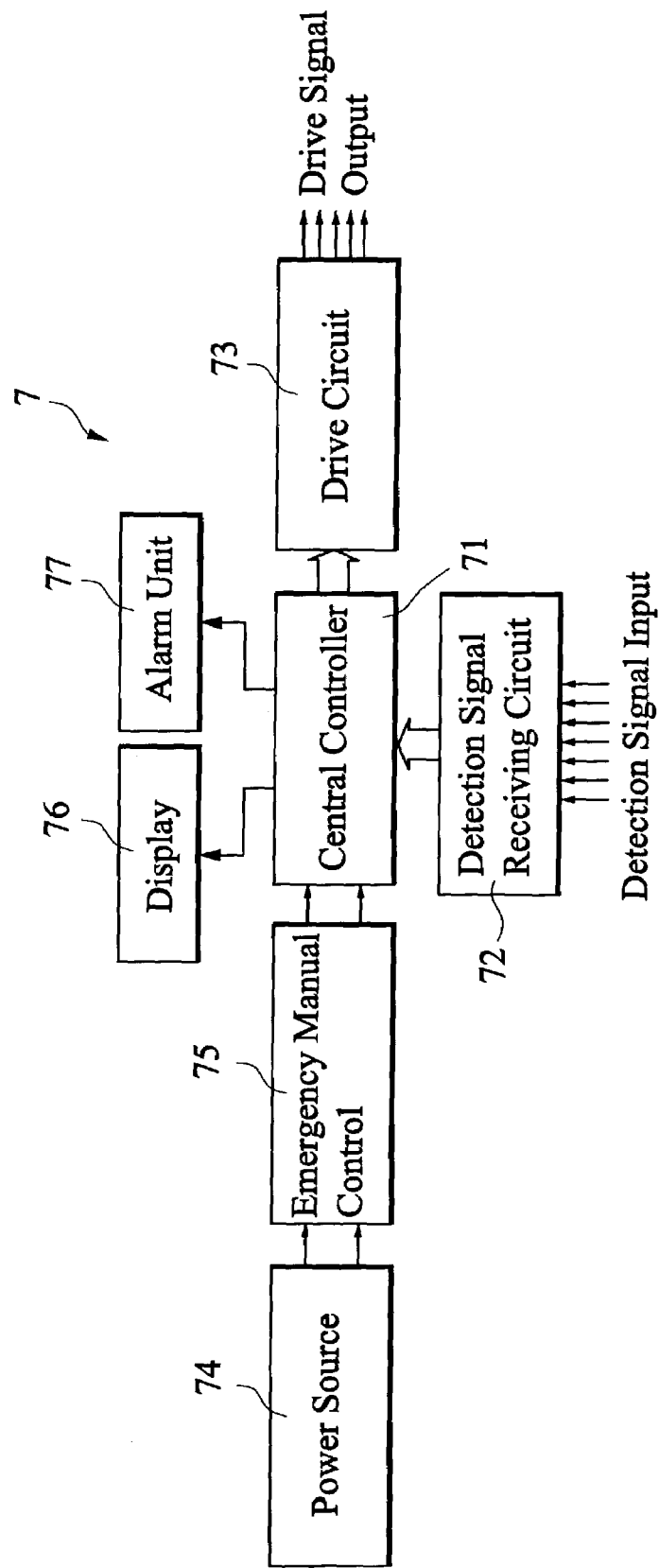
FIG. 2 is block diagram of a control module of the hydrogen storage canister charging/activating device in accordance with the present invention.

A control module for the hydrogen storage canister charging/activating device of the present invention is shown in FIG. 2. The control module, which is designated with reference numeral 7 in FIG. 2, comprises a central controller 71, such as a microprocessor, which is electrically coupled to a detection signal receiving circuit 72 to receive input of detection signals, including temperature signals from the temperature sensors 30, 50, 10, flow rate signal from the distribution and charge control unit 21 and other flow rate detection devices, hydrogen leakage signal from the hydrogen detector 6, as well as other signals, such as pressure signals from properly installed pressure sensors (not shown). The central controller 7 controls the operation of the device based on preset operation sequence and conditions by providing drive signals through a drive circuit 73. The drive signals are provided to the device to control the operation thereof. A power source 74 supplies power to the control module 7 and an emergency manual control 75 is arranged between the power source 74 and the control module 7 for manually stopping the operation of the device in an emergency condition.

A display 76 is connected to the central controller 71 for display of the operation conditions and system parameters, such as temperature, pressure, flow rate, and operation duration. An alarm unit 77 is coupled to the central controller 71 to issue warnings in an emergency condition, such as excessive temperature, excessive pressure, abnormal flow rate and leakage of hydrogen.

Figure 3:
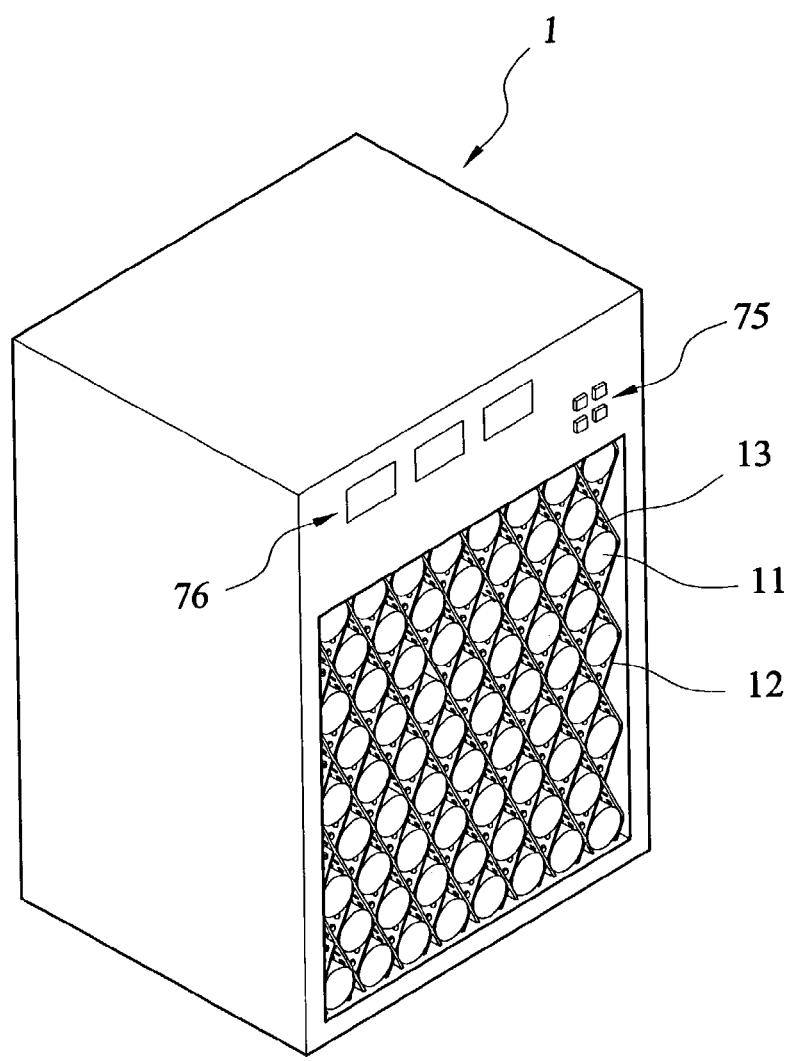
FIG. 3 is a perspective view of the hydrogen storage canister charging/activating device of the present invention.
Figure 4:
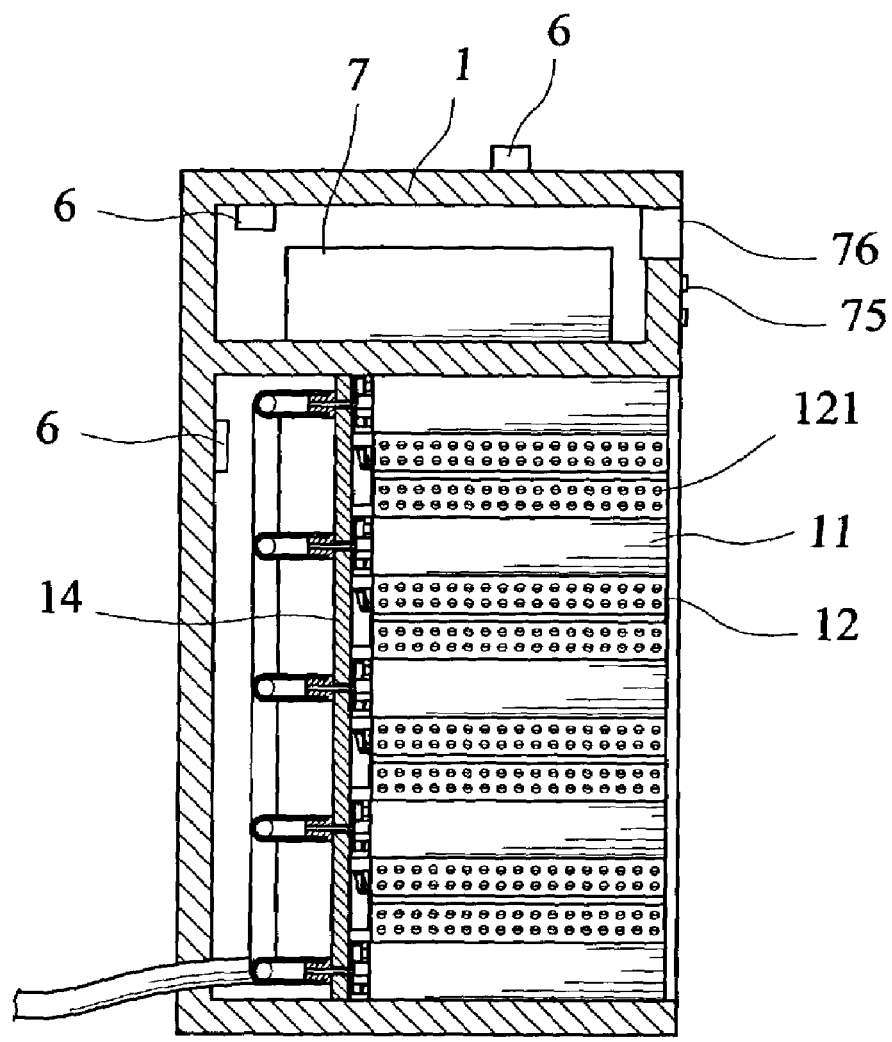
FIG. 4 is a cross-sectional view of the hydrogen storage canister charging/activating device of the present invention.

Also referring to FIGS. 3 and 4, the container 1 comprises a number of partitions 12 in the interior space thereof. The partitions 12 extend in diagonal directions and intersect each other to form rows of chambers 13, each row comprised of a number of chambers 13 spaced in a horizontal direction to each receive and retain a canister 11 therein. Holes 121 are formed in the partitions 12 for the flow of water from the cold water tank 5 and/or the hot water tank 3 circulating throughout the interior space of the container 1. In addition, the holes 121 may be arranged to cause turbulence of the water flowing through the container 1 in order to enhance heat transfer between the water and the canisters 11.

The container 1 forms a space (not labeled) therein for accommodating the control module 7. The display 76 is mounted to a front wall (not labeled) of the container 1 for visual observation thereof. The emergency manual control 75 is also mounted to the front wall for easy access by an operator to promptly shut down the device in an emergency condition.

Figure 5:
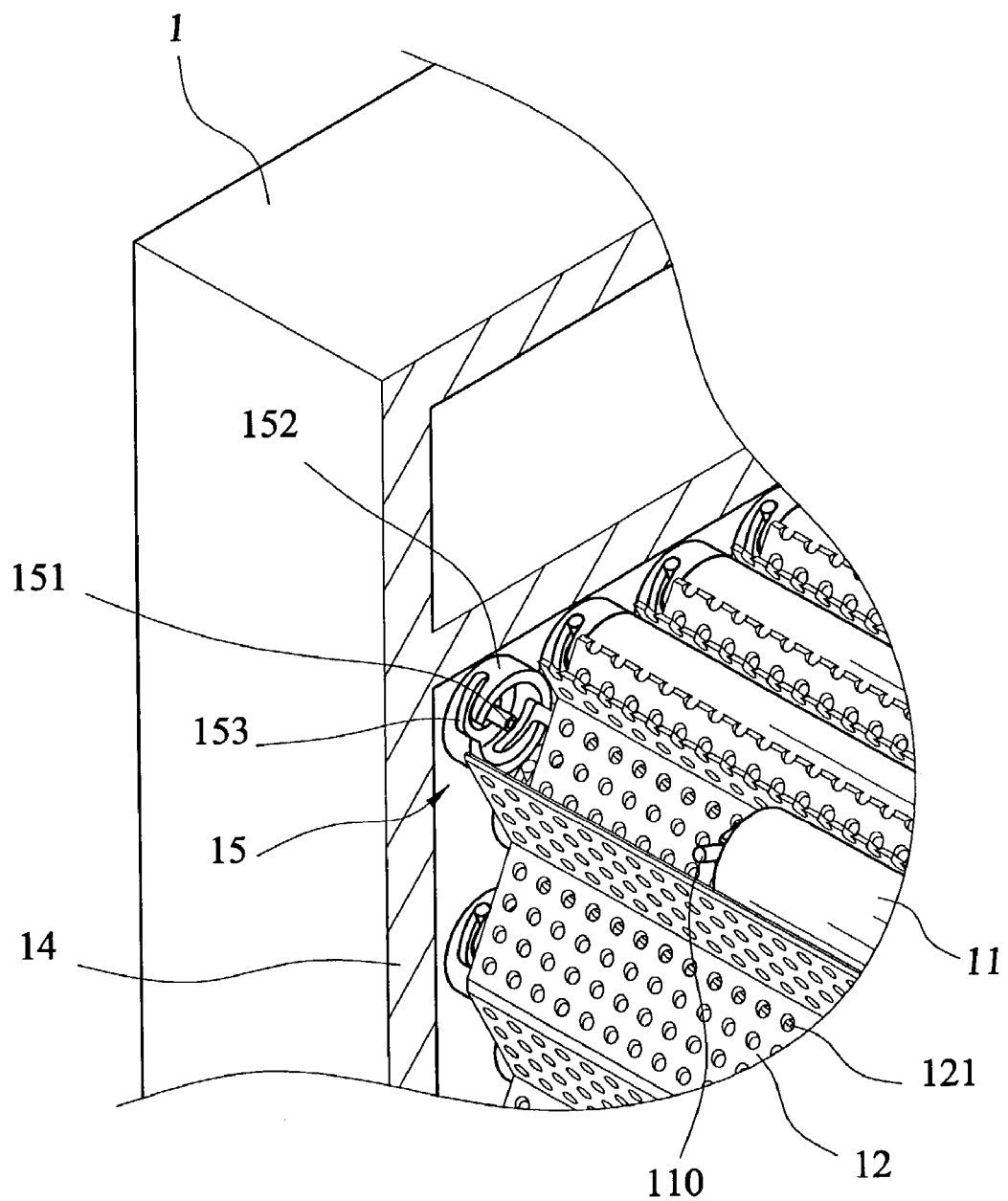
FIG. 5 is an enlarged view, partially broken, of a portion of the hydrogen storage canister of the present invention.

Also referring to FIG. 5, an interior wall 14 is formed inside the container 1. A number of connectors 15 are formed on the wall 14 respectively corresponding to the chambers 13 for connection with the canisters 11 retained in the chambers 13. Each connector 15 comprises a cylindrical wall 152 and a hydrogen supply port 151 formed at a center of the cylindrical wall 152. The hydrogen supply port 151 is connected by piping to the hydrogen supply source 2. Slots 153 are formed in the cylindrical wall 152 to form a quick connection type connection device. Each canister 11 has a connection end at which a mating port (not shown) is formed for releasable and ready connection with the hydrogen supply port 151 for receiving hydrogen supplied from the hydrogen supply source 2. Radially extending projections 110 are formed on the connection end of the canister 11 to engage the slots 153 of the connector 15 for coupling the connection end of the canister 11 to the connector 15. It is however apparent to those having ordinary skills to replace the quick connection type connection with other connection devices, such as threading connection and snapping connection.

Figure 6:
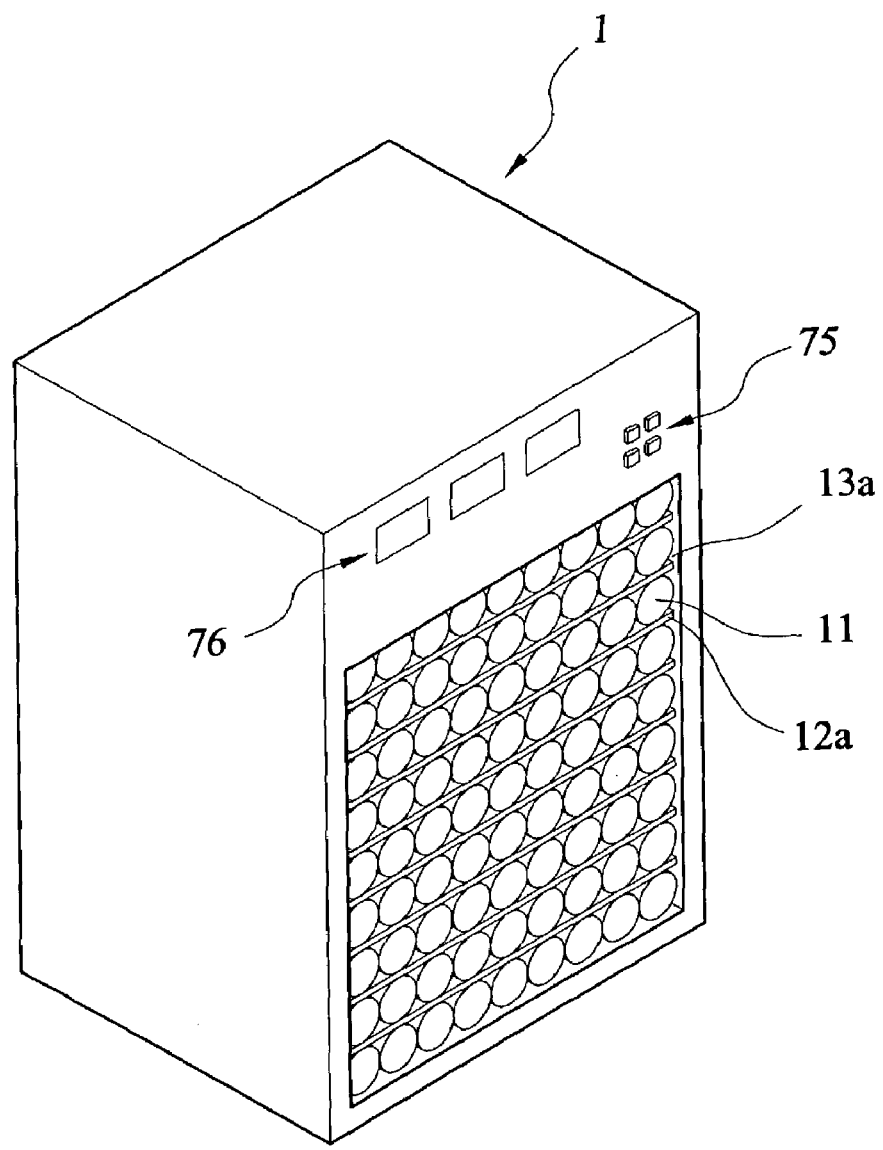
FIG. 6 is a perspective view of a hydrogen storage charging/activating device constructed in accordance with another embodiment of the present invention.

FIG. 6 shows a hydrogen storage canister charging/activating device in accordance with another embodiment of the present invention, which similarly comprises a container 1 having an interior space in which horizontally extending partitions 12a are mounted for forming vertically spaced chambers in which the canisters 11 are deposited. The remaining structure of the device is similar to that of the device shown in FIG. 3 and no further description is needed herein. If desired, vertically extending partitions (not shown) can be added to more securely retain the canisters 11.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A device for charging and activating a plurality of hydrogen storage canisters comprising:
   a container defining an interior space for receiving and retaining the hydrogen storage canisters distributed in arrayed manner one relative to the other, the container having connectors for respective releasable connection with the canisters;
   a vacuum pump connected to the container for withdrawing hydrogen from the canisters;
   an inert gas supply source coupled to the container for flushing hydrogen from the container that has leaked from the canisters;
   a plurality of perforated partitions mounted in the interior space of the container for forming a plurality of chambers to receive and retain the canisters; and
   a cold water tank circulating cold water throughout the interior space of the container and thereby circulate around the canisters for removing excessive heat from the canisters;
   wherein the device is adapted to be connected to a hydrogen supply source from which hydrogen is supplied to the canisters via the connectors for charging the canisters, wherein hydrogen residual in the canisters is discharged by the vacuum pump, and wherein the canisters are activated by means of alternating charging and discharging the canisters.

2. The device as claimed in claim 1 further comprising a flow control unit and a temperature control unit arranged between the cold water tank and the container.

3. The device as claimed in claim 1, wherein the cold water tank comprises a temperature sensor.

4. The device as claimed in claim 1 further comprising a gas exhaust control unit mounted to the container for withdrawal of undesired gas from the device.

5. The device as claimed in claim 1 further comprising a gas exhaust device through which undesired gas is released from the device.

6. The device as claimed in claim 1 further comprising a hydrogen evacuation control unit mounted to the container for controlling evacuation of the hydrogen by the vacuum pump.

7. A device for charging and activating a plurality of hydrogen storage canisters comprising:
- a container defining an interior space for receiving and retaining the hydrogen storage canisters distributed in arrayed manner one relative to the other, the container having connectors for respective releasable connection with the canisters;
- a vacuum pump connected to the container for withdrawing hydrogen from the canisters;
- an inert gas supply source coupled to the container for flushing hydrogen from the container that has leaked from the canisters;
- a plurality of perforated partitions mounted in the interior space of the container for forming a plurality of chambers to receive and retain the canisters; and
- a hot water tank circulating hot water throughout the interior space of the container and thereby circulate around the canisters for heating the canisters.

8. A device for charging and activating a plurality of hydrogen storage canisters comprising:
- a container defining an interior space for receiving and retaining the hydrogen storage canisters, the container having connectors for respective releasable connection with the canisters;
- a plurality of perforated partitions mounted in the interior space of the container for forming a plurality of chambers to receive and retain the canisters;
- a cold water tank circulating cold water throughout the interior space of the container and thereby circulate around the canisters for removing excessive heat from the canisters during charging thereof;
- a hot water tank circulating hot water throughout the interior space of the container and thereby circulate around the canisters for heating the canisters during discharging thereof;
- a vacuum pump connected to the container for withdrawing hydrogen from the canisters; and,
- a temperature sensor mounted to the container;
- wherein the device is adapted to be connected to a hydrogen supply source from which hydrogen is supplied to the canisters via the connectors for charging the canisters, wherein hydrogen residual in the canisters is discharged by the vacuum pump, and wherein the canisters are activated by means of alternating charging and discharging the canisters.

9. A device for charging a plurality of hydrogen storage containers comprising:
- a container defining an interior space for receiving and retaining the hydrogen storage canisters, the container having connectors for respective releasable connection with the canisters, the container comprising a plurality of partitions mounted in the interior space thereof for forming chambers to receive and retain the canisters;
- a cold water tank circulating cold water throughout the interior space of the container and thereby circulate around the canisters for removing excessive heat from the canisters during charging thereof;
- wherein the device is adapted to be connected to a hydrogen supply source from which hydrogen is supplied to the canisters via the connectors for charging the canisters, and wherein the plurality of partitions each have a plurality of holes formed therethrough, the plurality of holes being arranged to cause turbulence to the water circulating around the canisters and thereby enhance heat transfer therebetween.

10. The device as claimed in claim 9, wherein the partitions extend in a horizontal direction to form vertically spaced chambers for receiving and retaining the canisters.

11. The device as claimed in claim 9, wherein the partitions extend in diagonal directions and intersect each other to form horizontally spaced chambers for receiving and retaining the canisters.

12. The device as claimed in claim 9 further comprising at least one hydrogen detector for detecting leakage of hydrogen from the canisters.

13. The device as claimed in claim 9 further comprising a temperature sensor mounted to the container.

14. The device as claimed in claim 9 further comprising a distribution and charge control unit for controlling amount of hydrogen charged to the canisters.

* * * * *